United States Patent
Morard et al.

(10) Patent No.: US 10,122,787 B2
(45) Date of Patent: Nov. 6, 2018

(54) METHOD FOR THE REMOTE SHARING OF COMPUTER DESKTOP(S)

(75) Inventors: Jean-Pierre Morard, Rueil-Malmaison (FR); Gilles Bardoux, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 189 days.

(21) Appl. No.: 13/258,230

(22) PCT Filed: Mar. 25, 2010

(86) PCT No.: PCT/FR2010/050554
§ 371 (c)(1),
(2), (4) Date: Sep. 21, 2011

(87) PCT Pub. No.: WO2010/109151
PCT Pub. Date: Sep. 30, 2010

(65) Prior Publication Data
US 2012/0030579 A1 Feb. 2, 2012

(30) Foreign Application Priority Data

Mar. 25, 2009 (FR) ..................................... 09 51942

(51) Int. Cl.
*G06F 15/16* (2006.01)
*H04L 29/08* (2006.01)
(Continued)

(52) U.S. Cl.
CPC .......... *H04L 67/08* (2013.01); *H04L 12/1822* (2013.01); *H04L 67/14* (2013.01);
(Continued)

(58) Field of Classification Search
CPC .. G06F 3/1454; H04L 67/148; H04L 12/1822
(Continued)

(56) References Cited

U.S. PATENT DOCUMENTS 6,285,363 B1 * 9/2001 Mairs et al. .................. 715/751
6,564,246 B1 * 5/2003 Varma et al. ................. 709/205
(Continued)

OTHER PUBLICATIONS

"The Remote Framebuffer Protocol", RFC6143, T. Richardson, RealVNC Ltd., Mar. 2011.*
(Continued)

*Primary Examiner* — Philip Chea
*Assistant Examiner* — Robert B McAdams
(74) *Attorney, Agent, or Firm* — Pillsbury Winthrop Shaw Pittman LLP

(57) ABSTRACT

A method for the remote sharing of a computer office generated by an application executed in a server in response to commands issued by client terminals accessing this server via a telecommunication network, the commands of a client terminal being entered by means of an entry area termed the focus. The client terminals transmit, to the server, commands dedicated to office sharing, and entered by means of various focuses, in accordance with a graphics interface transmission protocol of the RUI type, standing for "Remote User Interface", so that the server matches up, by means of the focuses, the commands received and the offices shared so as to transmit, in response to the commands from the terminals, a graphics interface representative of this office of the server by means of indications of the state of the pixels in this graphics interface in accordance with the RUI protocol.

14 Claims, 2 Drawing Sheets

(51) Int. Cl.
*H04L 12/18* (2006.01)
*G06F 3/14* (2006.01)

(52) U.S. Cl.
CPC .............. *H04L 67/148* (2013.01); *G06F 3/14* (2013.01); *G06F 3/1454* (2013.01)

(58) Field of Classification Search
USPC .......................................... 715/740; 709/204
See application file for complete search history.

(56) References Cited

U.S. PATENT DOCUMENTS

| | | | | |
|---|---|---|---|---|
| 8,443,398 | B2* | 5/2013 | Swenson et al. | 725/54 |
| 2002/0015042 | A1* | 2/2002 | Robotham et al. | 345/581 |
| 2002/0087761 | A1 | 7/2002 | Clapp et al. | |
| 2002/0091697 | A1* | 7/2002 | Huang et al. | 707/10 |
| 2004/0049530 | A1* | 3/2004 | Lok et al. | 709/201 |
| 2005/0267779 | A1* | 12/2005 | Lee et al. | 705/1 |
| 2006/0010392 | A1* | 1/2006 | Noel et al. | 715/759 |
| 2006/0136828 | A1* | 6/2006 | Asano | 715/733 |
| 2008/0104174 | A1* | 5/2008 | Deaven et al. | 709/205 |
| 2008/0120553 | A1* | 5/2008 | Bergman et al. | 715/740 |
| 2008/0235361 | A1* | 9/2008 | Crosbie et al. | 709/223 |
| 2009/0070404 | A1 | 3/2009 | Mazzaferri | |
| 2009/0217177 | A1* | 8/2009 | DeGrazia | 715/753 |
| 2009/0276771 | A1* | 11/2009 | Nickolov et al. | 717/177 |
| 2010/0077090 | A1* | 3/2010 | Cohen | 709/228 |

OTHER PUBLICATIONS

International Search Report as issued for PCT/FR2010/050554.
Richardson, Tristan; "The RFB Protocol"; Real VNC Ltd, version 3.8, updated Feb. 26, 2009; http://www.realvnc.com.
Hyunju Lee et al.; "The u-MUSE System: An Integrated UPnP AV Home Entertainment System supporting RUI Service and Device Mobility"; Hybrid Information Technology, 2006, ICHIT 06., International Conference on, IEEE, Piscataway, NJ, USA, Nov. 9, 2006, pp. 712-717.
Tae-Ho Lee et al.; "Extending VNC for Effective Collaboration"; Strategic Technologies, 2008, IFOST 2008, Third International Forum on, IEEE, Piscataway, NJ, USA, Jun. 23, 2008, pp. 343-346.
Boyaci, Omer et al.; "Bass Application Sharing System"; Multimedia, 2008, ISM 2008, Tenth IEEE International Symposium on, IEEE, Piscataway, NJ, USA, Dec. 15, 2008, pp. 432-439.
Lu, Xiaolin; "WSFRB Protocol and Virtual Program Computing", Computer Supported Cooperative work in Design, 2004, Proceedings, The 8$^{th}$ International Conference on Xiamen, China, May 26-28, 2004, Piscataway, NJ, USA, IEEE, vol. 1, pp. 475-480.
Grolaux, Donatien et al.; "Migratable User Interfaces: Beyond Migratory Interfaces"; Mobile and Ubiquitous Systems: Networking and Services, 2004, Mobiquit Ous 2004, The First Annual International Conference on Boston, MA, USA, Aug. 22-26, 2004, Piscataway, NJ, USA, IEEE LNKD—DOI:10.1109/MOUIQ.2004. 1331749, Aug. 22, 2004, pp. 422-430.
Ocheltree, Kenneth et al.; "14.2: Net2Display™: A Proposed VESA Standard for Remoting Displays and I/O Devices over Networks", pp. 1-4.

* cited by examiner

METHOD FOR THE REMOTE SHARING OF COMPUTER DESKTOP(S)

CROSS REFERENCE TO RELATED APPLICATIONS

This application is the U.S. National Stage of PCT/FR2010/050554, filed Mar. 25, 2010, which in turn claims priority to French Patent Application No. 0951942, filed Mar. 25, 2009, the entire contents of all applications are incorporated herein by reference in their entireties.

TECHNICAL FIELD OF THE INVENTION

The present invention relates to a method for the remote sharing of computer desktop(s), particularly via a graphics sharing protocol of the RUI type.

TECHNOLOGICAL BACKGROUND OF THE INVENTION

An increasing number of applications allow a user, equipped with a terminal, to implement computer applications housed by a remote server of the terminal.

Typically, using the Internet network to enable an individual to be connected from a terminal, for example a computer situated at his home, to a remote server, for example situated in his workplace in order to access professional applications such as his mail or accounting, is known.

According to a first approach, this remote access via the Internet network is carried out by using a terminal 10 (FIG. 1) comprising a lightweight and minimal, or even nonexistent, operating system Indeed, in this first approach such a terminal 10 only has the function of enabling, on the one hand, the display on a monitor 12 of images generated from data received from a server 16 hosting the applications required by the user 11 and, on the other hand, transmitting commands, entered by using a keyboard and/or mouse 14 by the user 11, to this server 16.

For its part, server 16 thus receives these commands, via the network 15 of the Internet type, and uses an operating system 18 to apply the commands issued from data capture tools 14 to the hosted applications.

In summary, the management of applicative means is entirely carried out at the level of the link-attached host server 18 while terminal 10 has a role of a remote man/machine interface between the end user 11 and the server 18 to, in particular, generate the displayed images.

This first approach is described for example in the document "14.2: Net2display™: a proposed VESA standard for remoting diplays and I/O devices over networks" by K. Ocheltree, S. Millman, M. Macdonnell, D. Hobbs, J. Nieh and R. Baratto.

It presents the disadvantage of not enabling common sharing of a desktop hosted at the level of the remote server between several users, this common sharing being such that a same desktop and/or associated applications are identically displayed for all users sharing this desktop.

In such a common sharing, each modification of the desktop, and/or its associated applications, controlled by a user, are displayed at the level of all common users.

In addition, such a method does not easily implement a personal sharing, named virtual sharing, of the desktop and its applications, this virtual sharing being such that different personal desktops are displayed at the level of each user in conformance with these commands.

In such a virtual sharing, modifications of the desktop, and/or its associated applications, controlled by a user, are only displayed at the level of users of this virtual desktop.

Indeed, sharing of desktops between several users was not provided in the Net2Display approach, where only the utilization of several desktops by a same client (for a given session) is provided.

According to a second approach, remote access is performed by using a terminal comprising an operating system sufficiently developed to enable several users to share a same desktop in solidarity.

For example, such an approach is implemented in the RDP 6 operating system under Windows™ 2008, from the Microsoft Inc. USA company, implemented at the terminal level.

However, this second approach is based on tools whose technical characteristics—for example in terms of communication protocols, memory capacities and/or work frequency, are unsuitable and distinct in relation to characteristics from the domain of high-speed public Internet access.

In fact, such a domain is characterized by the use of digital television decoders presenting limited resources and proprietary protocols specially developed for implementing its limited applications.

Consequently, sharing a desktop via such digital decoders requires a costly and complex adaptation of decoders and their applications so that they are compatible with the protocols and language of the applications to be shared.

GENERAL DESCRIPTION OF THE INVENTION

In this context, the present invention aims to resolve at least one of these disadvantages by proposing a method for the remote sharing of a computer desktop by using a protocol that is simple, public and easy to implement, particularly with high-speed Internet access digital decoders.

It results from the observation that a graphics sharing protocol of the RUI "Remote User Interface" type, turns out to be compatible for enabling the sharing of desktops, both common and virtual, via a digital decoder considering, on the one hand, the simplicity of its implementation enabling new functions to be developed and, on the other hand, its nature based on the remote storage of graphics interfaces and the transmission of images, described in detail in the subsequent description.

This is why the invention relates to a method for the remote sharing of a computer desktop generated by an application executed in a server in response to commands issued by client terminals accessing this server via a telecommunication network, the commands of a client terminal being entered by means of an entry area termed the focus, characterized in that the client terminals transmit to the server commands dedicated to desktop sharing, entered by means of different focuses, in conformance with a graphics interface transmission protocol of the RUI type, for "Remote User Interface," such that the server matches up, by means of said focuses, the commands received and the desktops shared in order to transmit, in response to the commands from the terminals, a graphics interface representative of this desktop of the server by means of indications of the state of the pixels in this graphics interface in conformance with this RUI type protocol.

Thanks to the invention, a user may easily implement the sharing of remote computer desktop(s), by means of a lightweight and easy to implement protocol in existing digital video decoders.

Indeed, an RUI type protocol transmits signals aiming to indicate the display that a pixel needs to make such that, for a digital decoder generally associated with a television or computer screen, the transmission of this information to this screen turns out to be simple to implement.

In addition, an RUI type protocol enables simple functions for sharing a screen to be developed, as seen subsequently. Consequently, the commands necessary for sharing a screen, according to a common or virtual mode, are easily attainable.

In summary, the use of a plurality of focuses for managing the sharing of desktop(s) enables this sharing to be easily and economically implemented.

In an embodiment, the server transmits a same graphics interface to client terminals commonly sharing a same desktop.

According to one embodiment, the commands transmitted by each of the client terminals performing a common sharing of a same graphics interface are executed by their server, in their order of receipt, the graphics interface generated by the server for this common desktop following the execution of a command being transmitted to all of the client terminals performing the common sharing.

In one embodiment, the server transmits distinct graphics interfaces to client terminals virtually sharing distinct desktops.

According to one embodiment, the commands transmitted by one of the client terminals performing a virtual sharing of different graphics interfaces are executed, by their server, only in relation to the graphics interface of the desktop associated with this terminal.

In one embodiment, the RUI type protocol is based on an RFB for "Remote Frame Buffer" type protocol.

According to one embodiment, the method takes into consideration at least one of the following RFB type commands:
"GetVirtualDesktopList": to send a message from a client terminal to the server in order to request possible desktops available on the server,
"VirtualDesktopList": so that the server responds to the request of the client terminal by transmitting the list of available desktops,
"VirtualDesktopAuthentication" so that a client terminal may choose to be connected on a virtual desktop already existing via the function,
"NotifyClientConnection" to inform a client terminal of the connection request from the other client terminal,
"VirtualDesktopAuthenticationAllowance": To accept or refuse the sharing of a desktop in common mode, this acceptance or refusal being notified by sending a message from the server to a client terminal requiring this sharing.

In one embodiment, the server associates on the one hand an identifier of a client terminal with a set of focus identifiers each corresponding to at least one client-side data capture peripheral device, and associates on the other hand an identifier of a terminal with a virtual desktop.

The invention also relates to a server intended to carry out a remote sharing of a computer desktop generated by one or more applications executed locally in response to commands issued by client terminals accessing this server via a telecommunication network, characterized in that the invention comprises:

means to receive, from client terminals, commands dedicated to desktop sharing and compliant with an RUI type graphics interface transmission protocol, and means to manage a plurality of focuses, or areas to enter commands from client terminals, that may access a same resource presented by an application means to transmit, in response to the terminals, a graphics interface representative of the desktop by means of indications of the state of the pixels in this graphics interface in conformance with the RUI type protocol, in conformance with a method according to one of the previous embodiments.

The invention also relates to a terminal intended to remotely share a computer desktop generated by an application executed in a server in response to commands issued by this terminal via a telecommunication network from a command area named a focus, characterized in that the invention comprises:

means to transmit to the server commands dedicated to desktop sharing, associated with a focus specific to the client terminal and compliant with an RUI type graphics interface transmission protocol, and means to receive from the server a graphics interface representative of the desktop by means of indications of the state of the pixels in this graphics interface in conformance with the RUI type protocol, according to a method in conformance with one of the previous embodiments.

BRIEF DESCRIPTION OF THE FIGURES

Other characteristics and advantages of the invention will clearly emerge from the description given below, for indicative and in no way limiting purposes, with reference to the attached figures in which.

DESCRIPTION OF PREFERRED FORMS OF EMBODIMENT OF THE INVENTION

Figure 1:
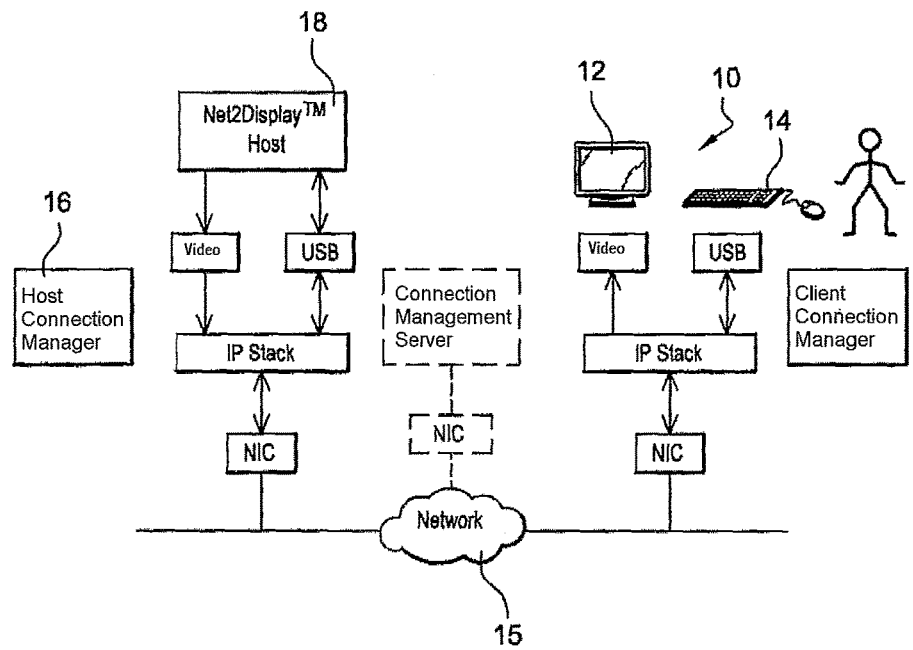
FIG. 1, already described, schematically represents a remote access system of a terminal to a server according to the prior art, FIG. 2 schematically represents the operation of an RFB type protocol.
Figure 2:
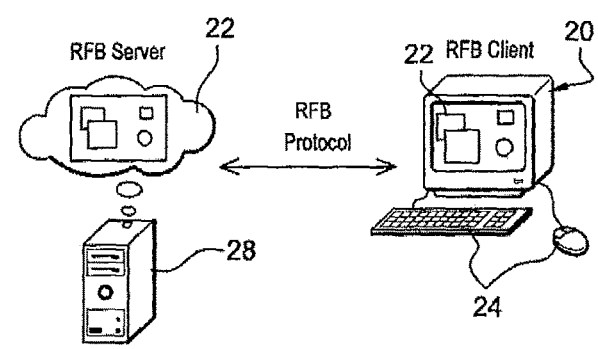

The description of the invention carried out below implements an RUI type protocol such as the RFB protocol described, for example, in the document "The RFB Protocol," by Tristan Richardson, Real VNC Ltd, version 3.8, updated on 26 Feb. 2009 (http://www.realvnc.com).

According to such a protocol, a user terminal 20, named RFB terminal or client terminal, displays a graphics interface 22 generated by a remote RFB server 28 that hosts hardware means—components—and software means—software—to determine the characteristics of this graphics interface 22 according to the commands issued by this terminal 20 via its data capture tools 24.

Indeed, the RFB protocol is characterized by the use of simple graphics instructions such as a command to display a rectangle of pixels of data at a given position (x, y) of the screen.

Each image formed by the RFB server is stored in a buffer memory—known as a "framebuffer" of the server 28, generally coded in RGB (Red Green Blue) format, that constitutes the most direct way to code images, the three planes corresponding to the three primary colors red, green and blue.

By virtue of its graphic specificity, an RUI protocol such as the RFB protocol does not appear to enable the production of complex applications such as the remote sharing of a computer desktop.

However, according to an observation specific to the invention, the RFB protocol easily enables sharing a same desktop—common sharing and sharing the applicative means to manage different desktops—individual or virtual sharing—specific to several users.

In the first case, a common sharing of a desktop directly results from the nature of an RUI type protocol that, remotely generating the image of the interface and/or its applications, may share its images created in situ with different terminals.

In other words, such an RUI type protocol enables the simple and easy sharing of a same desktop since the management of the latter is not directly carried out by an RFB terminal, but is centralized at the level of the RFB server.

Consequently, an RUI type server must easily implement means, such as an instruction stack, to manage the common desktop, and/or its applications, according to instructions from the different terminals, modifications of the graphics interface being shared with all these RFB terminals.

In the second case—virtual sharing—it should be noted that the RUI type protocol implements coding of data associated with pixels of the graphics interface that enables new functions to be easily developed.

For example, the RFB protocol implements exchanges between the RFB server and its RFB terminals to determine the format and encoding of pixel data, provided that the format refers to the color of the pixels—for example 24-bits or 16-bits, while the encoding refers to the way in which a rectangle of pixels is identified on the screen.

Consequently, new functions may be generated to associate virtual desktops with distinct RFB terminals such that the commands issued by each RFB terminal may be implemented specifically in relation to a virtual desktop associated with this RFB terminal.

By way of example, the following functions have been developed to enable the management of such virtual desktops via the RFB standard in which the usual designations are repeated below:

The function of sending a message from the client terminal to the RFB server for the request of available desktops on a given server named "GetVirtualDesktopList"

| Number of octets | Type [Value] | Description |
| --- | --- | --- |
| 1 | U8 10 | message-type |

The function of sending a message in response, from the RFB server to the RFB client, to give the list of available desktops named "Virtual DesktopList"

| No. of bytes | Type [Value] | Description |
| --- | --- | --- |
| 1 | U8 10 | message-type |
| 2 | U16 N | number of virtual desktops (=N) |
| N*sizeof(VIRTUAL_DESKTOP) | VIRTUAL_DESKTOP array | List of available virtual desktops on the server |

For this purpose, the structure of a virtual desktop, or "VIRTUAL_DESKTOP," may be formed in the following manner:

| No. of bytes | Type [Value] | Description |
| --- | --- | --- |
| 4 | U32 | virtual_desktop_id |
| 4 | U32 N | number_of_users |
| N*sizeof(USER) | USER array | Names of current users connected to this virtual desktop |

While the USER structure is the following:

| No. of bytes | Type [Value] | Description |
| --- | --- | --- |
| 4 | U32 | user_id |
| 32 | U8 array | User_name |

The function of sending a message from the RFB client to the server for authentication on an already existing virtual desktop, named "VirtualDesktopAuthentication"

| No. of bytes | Type [Value] | Description |
| --- | --- | --- |
| 1 | U8 11 | message-type |
| 4 | U32 | virtual_desktop_id |
| 4 | U32 | user_id (id of the client wishing to connect on the virtual desktop identified by virtual_desktop_id) |

Function of sending a message from the RFB server to the client terminal for the notification to a client terminal (CLIENT1) of the connection request from another client terminal (CLIENT2) on the virtual desktop utilized by CLIENT1, named "NotifyClientConnection."

| No. of bytes | Type [Value] | Description |
| --- | --- | --- |
| 1 | U8 11 | message-type |
| sizeof(USER) | USER | new_user |

The function of sending a message from the RFB client terminal to the server for the connection acceptance or refusal of another client on the given virtual desktop named "VirtualDesktopAuthenticationAllowance."

| No. of bytes | Type [Value] | Description |
| --- | --- | --- |
| 1 | U8 12 | message-type |
| 4 | U32 | user_id (identifies the user giving the permission) |
| 4 | U32 | new_user_id (identifies the user who wants to connect) |
| 4 | U32 | virtual_desktop_id (identifies the queried virtual desktop) |
| 1 | U8 0 => accept 1 => reject | Accept_flag |

The function of sending an RFB server message to the RFB client to notify a given virtual desktop of the success or failure of the connection. "VirtualDesktopAuthenticationResult."

| No. of bytes | Type [Value] | Description |
| --- | --- | --- |
| 1 | U8 12 | message-type |
| 4 | U32 | virtual_desktop_id |
| 1 | U8 01 => accept => reject | Accept_flag |

The function of sending an RFB client message to the RFB server to disconnect from a virtual desktop, named "VirtualDesktopDisconnect."

| No. of bytes | Type [Value] | Description |
| --- | --- | --- |
| 1 | U8 13 | message-type |
| 4 | U32 | virtual_desktop_id |
| 1 | U8 0 => accept 1 => reject | Accept_flag |

The function of sending a message from the RFB client to the RFB server to notify of the client-side virtual desktop change named "VirtualDesktopSwitch."

| No. of bytes | Type [Value] | Description |
| --- | --- | --- |
| 1 | U8 14 | message-type |
| 4 | U8 | User_id |
| 4 | U32 | new_virtual_desktop_id |

In this case, the client must already be connected to the virtual desktop, identified by "new_virtual_desktop_id," to establish the connection.

The function of sending a message from the RFB client to the RFB server for the events from a keyboard, mouse, or any other data capture peripheral device, accompanied by the client identifier, as well as an indicator saying if the event is exclusive or not exclusive to a desktop named "VirtualDesktopinputEvent."

| No. of bytes | Type [Value] | Description |
| --- | --- | --- |
| 1 | U8 14 | message-type |
| 4 | U8 | User_id |
| 4 | U32 | virtual_desktop_id |
| 4 | U32 | Event_type |
| 1 | U 0 => non exclusive 1 => exclusive | Exclusive_flag |

It thus appears that the RFB protocol, enriched with such functions, enables a plurality of terminals 20 to be associated with an RFB server 24 in order to generate virtual desktops specific to each terminal 20.

Figure 3:
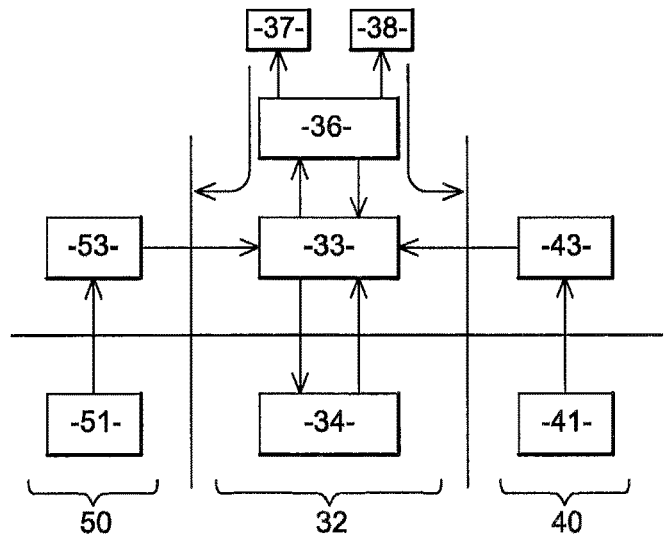
FIG. 3 represents a functional diagram describing the remote access of two client terminals to a server according to the invention.

Such an implementation is illustrated in FIG. 3 that represents two client terminals 40 and 50 comprising respective drivers 41 and 51 that may transmit commands to a VNC server 32, for Virtual Network Connection, hosting a computer desktop and software applications associated with the latter.

Communication means 43 and 53 of RFB terminals communicating with means 33 of the RFB server 32 by using, for example, an IP protocol.

Typically, these communications implement "GetVirtualDesktopList," functions to send a message from client terminals to the RFB server in order to request the available desktops on server 32, and "VirtualDesktopList" so that the RFB server responds to the requests from RFB clients by transmitting the list of available desktops.

From this list, a terminal 40 or 50 may choose to be connected on an already existing virtual desktop via the "VirtualDesktopAuthentication" function.

However, this virtual desktop may already be used by a client terminal (CLIENT1) that is then informed of the connection request from the other client terminal (CLIENT2)—"NotifyClientConnection" function.

The latter may, via the "VirtualDesktopAuthenticationAllowance," accept or refuse the sharing of a desktop in common mode, this acceptance or refusal being notified by sending a message from the RFB server to the RFB client—"VirtualDesktopAuthenticationResult" function.

It should be noted that these operations are implemented at the operating level 34 of the server 32 that also sorts commands specific to each common or shared desktop.

Indeed, the different commands received by the server 32 are compiled at the level of a stack 60 (FIG. 4) of commands from which a selection operation 62 separates the operations 64 specific to all desktops, for example activating the program manager while simultaneously pressing the "CTRL" "ALT" and "DEL" keyboard keys, operations 63 specific to a virtual desktop.

Figure 4:
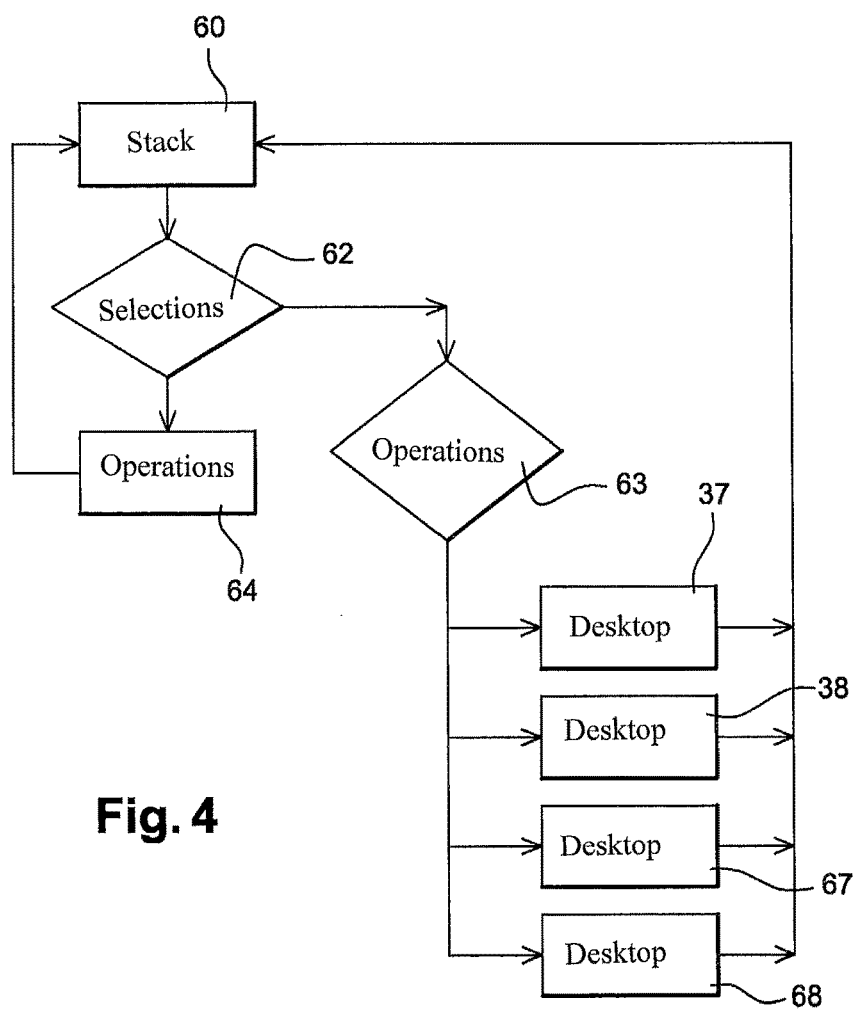
FIG. 4 represents a flow chart of operations performed by an RFB server implementing the invention.

In the latter case, applicative means 36 (FIG. 3) transmit each instruction to the relevant desktop 37 or 38 (FIGS. 3 and 4) or 67 and 68 (FIG. 4).

Once the instructions are processed, the RFB client may be disconnected from the RFB server with the "VirtualDesktopDisconnect" command or to change the client-side virtual desktop—"VirtualDesktopSwitch" command.

It should be noted that, to transmit commands, a user may implement any type of data capture tool such as a keyboard, mouse, or any other data capture peripheral device, accompanied by the client identifier, as well as an indicator saying if the event is exclusive or not exclusive to a desktop called "VirtualDesktopinputEvent."

In this embodiment, this identifier enables a correspondence table to be generated, at the level of the RFB server, between a focus i, i.e., an entry area that may correspond to a keyboard, a mouse, a tactile screen or more generally, to any client terminal command entry, and a virtual desktop.

Thus an RFB client, that transmits all its requests by means of a focus, is automatically associated with a virtual desktop—after opening the session as indicated above.

The present invention is open to many variations. For example, an RFB terminal may present several data capture tools—keyboards or mouse devices for example—associated with one or more monitors that may be local—directly connected to the server—or remote—indirectly connected to the server via an Internet type network.

In addition, the RFB server may also be an RFB terminal such that it shares, commonly or virtually, its resources with other terminals.

Finally, a client terminal may have access to several desktops simultaneously, for example a common desktop—shared—and a virtual desktop—not shared or shared with a limited number of other client terminals.

The invention claimed is:

1. A method for the remote sharing of a virtual computer desktop generated by an application executed in a server in response to commands issued by client terminals accessing said server via a telecommunication network, the issued commands of the client terminals being entered via entry areas corresponding to input mechanisms of each of the respective client terminals, the method comprising:
   receiving, by the server, the issued commands from the client terminals dedicated to virtual computer desktop sharing that are entered using entry areas of the respective client terminals, in conformance with a graphics interface transmission protocol of the RUI (Remote User Interface) type, so that said virtual computer desktop is able to be shared by the client terminals, wherein the RUI type protocol is based on an RFB (Remote Frame Buffer) type protocol;
   establishing, by the server, a correspondence table containing entry area identification information identifying each of the entry areas of the respective client terminals;
   matching up, by the server, the issued commands received and virtual computer desktops to be shared, based on the entry area identification information of the correspondence table; and
   transmitting, by the server and in response to the issued commands from the client terminals, a graphics interface representative of the virtual computer desktop to be shared using indications of a state of pixels in the graphics interface in conformance with the RUI type protocol
   wherein the method comprises defining a plurality of RFB commands, each defined RFB command being built from a plurality of RFB-standard functions and protocols, the defined RFB commands including:
      a command configured to send a message from a client terminal to the server in order to request possible virtual computer desktops available on the server,
      a command to configure the server to respond to the request of the client terminal by transmitting the list of available virtual computer desktops,
      a command to enable a client terminal to choose to be connected on an existing virtual computer desktop,
      a command to inform a client terminal of the connection request from the other client terminal,
      and a command to accept or refuse the sharing of a virtual computer desktop in common mode, this acceptance or refusal being notified by sending a message from the server to a client terminal requiring the sharing.

2. The method according to claim 1, wherein the server transmits a same graphics interface to client terminals commonly sharing a same virtual computer desktop.

3. The method according to claim 2, wherein the commands transmitted by each of the client terminals commonly sharing a same graphics interface are executed by the server, in their order of receipt, the graphics interface generated by the server for the common virtual computer desktop following the execution of a command being transmitted to all of the client terminals performing the common sharing.

4. The method according to claim 1, wherein the server transmits distinct graphics interfaces to client terminals virtually sharing distinct virtual computer desktops.

5. The method according to claim 4, wherein the commands transmitted by one of the client terminals virtually sharing different graphics interfaces are executed, by the server, only in relation to the graphics interface of the virtual computer desktop associated with this terminal.

6. The method according to claim 1, wherein the entry area identification information of the correspondence table enables the server to automatically:
   associate a client terminal identifier with one or more entry area identifiers in which each entry area identifier corresponds to at least one input mechanism of each of the client terminals, and
   associate a terminal identifier with a virtual computer desktop.

7. A server configured to carry out a remote sharing of a virtual computer desktop generated by one or more applications executed locally in response to commands issued by client terminals accessing this server via a telecommunication network, the server comprising hardware components and:
   a receiver to receive, from client terminals, the issued commands dedicated to virtual computer desktop sharing and compliant with an RUI type graphics interface transmission protocol,
   a management module implemented on one of the hardware components to manage a plurality of entry areas to enter commands from client terminals, that may access a same resource presented by an application,
   a transmitter to transmit, in response to the terminals, a graphics interface representative of the virtual computer desktop using indications of the state of the pixels in the graphics interface in conformance with the RUI type protocol, in conformance with a method according to claim 1.

8. A terminal configured to remotely share a virtual computer desktop generated by an application executed in a server in response to commands issued by the terminal via a telecommunication network from a command area, the terminal comprising:
   a transmitter to transmit to the server commands dedicated to virtual computer desktop sharing, associated with an entry area specific to the client terminal and compliant with an RUI type graphics interface transmission protocol, said commands being entered in the entry area using a hardware component of the terminal, and
   a receiver to receive from the server a graphics interface representative of the virtual computer desktop using indications of the state of the pixels in the graphics interface in conformance with the RUI type protocol, according to a method of claim 1.

9. The terminal according to claim 8, wherein the hardware component is a keyboard or a mouse.

10. The method according to claim 1, comprising compiling by the server the different commands received from the client terminals and sorting by the server said received commands to separate operations shared by all virtual computer desktops and operations specific to a virtual computer desktop.

11. The method according to claim 1, wherein the method takes into consideration a RFB type command to send a message from a client terminal to the server in order to request disconnection from the virtual computer desktop.

12. The method according to claim 1, wherein the server transmits distinct graphics interfaces to one of the client terminals so that said one of the client terminals has access to several computer desktops simultaneously.

13. The method according to claim 12, wherein the several computer desktops include a computer desktop that is shared among various client terminals and a virtual desktop that is not shared or shared with a limited number of other client terminals.

14. The terminal according to claim 9, wherein the hardware component further comprises a plurality of monitors that are indirectly connected to the server via an Internet type network.

* * * * *